(12) United States Patent
Belzile et al.

(10) Patent No.: US 8,708,683 B2
(45) Date of Patent: Apr. 29, 2014

(54) MOLD-RUNNER SYSTEM HAVING INDEPENDENTLY CONTROLLABLE SHOOTING-POT ASSEMBLIES

(75) Inventors: Manon Danielle Belzile, Fairfield, VT (US); Paul R. Blais, South Burlington, VT (US); Brian Esser, Colchester, VT (US); Patrice Fabien Dezon-Gaillard, Jericho, VT (US); Edward Joseph Jenko, Essex, VT (US); John Knapp, St. Albans, VT (US)

(73) Assignee: Husky Injection Molding Systems Ltd., Bolton, Ontario (CA)

( * ) Notice: Subject to any disclaimer, the term of this patent is extended or adjusted under 35 U.S.C. 154(b) by 61 days.

(21) Appl. No.: 13/519,932

(22) PCT Filed: Oct. 8, 2010

(86) PCT No.: PCT/US2010/051889
§ 371 (c)(1),
(2), (4) Date: Jun. 29, 2012

(87) PCT Pub. No.: WO2011/081694
PCT Pub. Date: Jul. 7, 2011

(65) Prior Publication Data
US 2012/0276235 A1    Nov. 1, 2012

Related U.S. Application Data

(60) Provisional application No. 61/291,475, filed on Dec. 31, 2009.

(51) Int. Cl.
*B29C 45/23*    (2006.01)

(52) U.S. Cl.
USPC ............ 425/130; 425/150; 425/557; 425/572

(58) Field of Classification Search
USPC .................. 425/130, 150, 557, 558, 559, 572
See application file for complete search history.

(56) References Cited

U.S. PATENT DOCUMENTS

| | | |
|---|---|---|
| 3,231,656 A | 1/1966 | Ninneman |
| 3,252,184 A | 5/1966 | Ninneman |
| 3,718,166 A | 2/1973 | Gordon |
| 4,071,532 A | 1/1978 | Rose |
| 4,090,836 A | 5/1978 | Von Der Ohe et al. |
| 4,333,608 A | 6/1982 | Hendry |
| 4,422,841 A | 12/1983 | Alfonsi et al. |
| 4,717,324 A | 1/1988 | Schad et al. |
| 4,784,819 A | 11/1988 | Spurr |
| 4,863,369 A | 9/1989 | Schad et al. |
| 4,931,234 A | 6/1990 | Schad et al. |

(Continued)

FOREIGN PATENT DOCUMENTS

| | | |
|---|---|---|
| EP | 0960714 A2 | 2/1997 |
| WO | 2006016609 A1 | 2/2006 |

OTHER PUBLICATIONS

International Search Report, 3 pages.

*Primary Examiner* — Tim Heitbrink

(57) ABSTRACT

A mold-tool system for use with a molding-system platen structure, the mold-tool system a frame assembly being connectable with the molding-system platen structure (107); and a set of shooting-pot assemblies being supported by the frame assembly, wherein control of each shooting-pot assembly of the set of shooting-pot assemblies is independent.

15 Claims, 6 Drawing Sheets

(56) References Cited

U.S. PATENT DOCUMENTS

| | | | |
|---|---|---|---|
| 4,964,795 | A | 10/1990 | Tooman |
| 4,966,545 | A | 10/1990 | Brown et al. |
| 5,000,675 | A | 3/1991 | Gellert et al. |
| 5,069,840 | A | 12/1991 | Arnott |
| 5,112,212 | A | 5/1992 | Akselrud et al. |
| 5,123,833 | A | 6/1992 | Parker |
| 5,192,555 | A | 3/1993 | Arnott |
| 5,260,012 | A | 11/1993 | Arnott |
| 5,536,164 | A | 7/1996 | Brun, Jr. et al. |
| 5,738,149 | A | 4/1998 | Brun, Jr. et al. |
| 5,773,038 | A | 6/1998 | Hettinga |
| 5,814,358 | A | 9/1998 | Bock |
| 5,858,420 | A | 1/1999 | Szajak et al. |
| 6,152,721 | A | 11/2000 | Schad et al. |
| 6,241,932 | B1 | 6/2001 | Choi et al. |
| 6,491,509 | B1 | 12/2002 | Schad et al. |
| 6,540,496 | B1 | 4/2003 | Schad |
| 6,632,079 | B1 | 10/2003 | Kazmer et al. |
| 6,649,094 | B1 | 11/2003 | Galt et al. |
| 6,776,600 | B1 | 8/2004 | Zahoransky et al. |
| 6,884,061 | B2 | 4/2005 | Okamura |
| 7,156,634 | B2 | 1/2007 | Bouti |
| 7,291,298 | B2 | 11/2007 | Serniuck et al. |
| 7,291,304 | B2 | 11/2007 | Bouti |
| 7,419,625 | B2 | 9/2008 | Vasapoli et al. |
| 7,559,756 | B2 | 7/2009 | Sicilia |
| 7,569,169 | B2 | 8/2009 | Vasapoli et al. |
| 8,241,032 | B2 * | 8/2012 | Klobucar et al. ............ 425/572 |
| 2006/0003038 | A1 | 1/2006 | Serniuck |
| 2007/0154586 | A1 | 7/2007 | Larsen |
| 2009/0191302 | A1 | 7/2009 | Jenko et al. |
| 2009/0206501 | A1 | 8/2009 | Van Eerde et al. |
| 2009/0274790 | A1 | 11/2009 | Jenko et al. |

\* cited by examiner

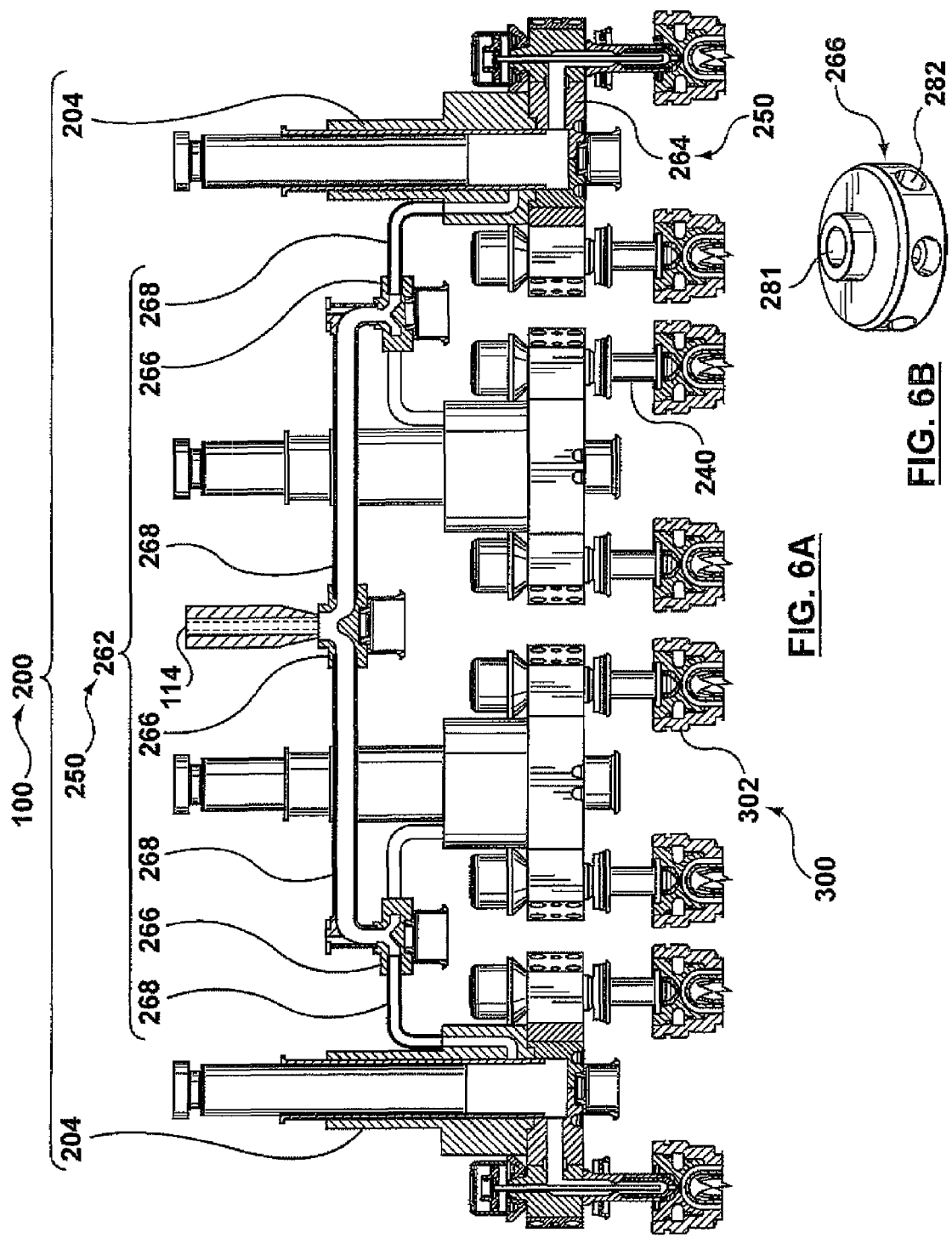

MOLD-RUNNER SYSTEM HAVING INDEPENDENTLY CONTROLLABLE SHOOTING-POT ASSEMBLIES

TECHNICAL FIELD

An aspect of the present invention generally relates to (but is not limited to) a mold-runner system having a set of shooting-pot assemblies wherein control of each shooting-pot assembly of the set of shooting-pot assemblies is independent.

BACKGROUND

The first man-made plastic was invented in Britain in 1851 by Alexander PARKES. He publicly demonstrated it at the 1862 International Exhibition in London, calling the material Parkesine. Derived from cellulose, Parkesine could be heated, molded, and retain its shape when cooled. It was, however, expensive to produce, prone to cracking, and highly flammable. In 1868, American inventor John Wesley HYATT developed a plastic material he named Celluloid, improving on PARKES' invention so that it could be processed into finished form. HYATT patented the first injection molding machine in 1872. It worked like a large hypodermic needle, using a plunger to inject plastic through a heated cylinder into a mold. The industry expanded rapidly in the 1940s because World War II created a huge demand for inexpensive, mass-produced products. In 1946, American inventor James Watson HENDRY built the first screw injection machine. This machine also allowed material to be mixed before injection, so that colored or recycled plastic could be added to virgin material and mixed thoroughly before being injected. In the 1970s, HENDRY went on to develop the first gas-assisted injection molding process.

Injection molding machines consist of a material hopper, an injection ram or screw-type plunger, and a heating unit. They are also known as presses, they hold the molds in which the components are shaped. Presses are rated by tonnage, which expresses the amount of clamping force that the machine can exert. This force keeps the mold closed during the injection process. Tonnage can vary from less than five tons to 6000 tons, with the higher figures used in comparatively few manufacturing operations. The total clamp force needed is determined by the projected area of the part being molded. This projected area is multiplied by a clamp force of from two to eight tons for each square inch of the projected areas. As a rule of thumb, four or five tons per square inch can be used for most products.

If the plastic material is very stiff, it will require more injection pressure to fill the mold, thus more clamp tonnage to hold the mold closed. The required force can also be determined by the material used and the size of the part, larger parts require higher clamping force. With Injection Molding, granular plastic is fed by gravity from a hopper into a heated barrel. As the granules are slowly moved forward by a screw-type plunger, the plastic is forced into a heated chamber, where it is melted. As the plunger advances, the melted splastic is forced through a nozzle that rests against the mold, allowing it to enter the mold cavity through a gate and runner system. The mold remains cold so the plastic solidifies almost as soon as the mold is filled. Mold assembly or die are terms used to describe the tooling used to produce plastic parts in molding. The mold assembly is used in mass production where thousands of parts are produced. Molds are typically constructed from hardened steel, etc. Hot-runner systems are used in molding systems, along with mold assemblies, for the manufacture of plastic articles. Usually, hot-runners systems and mold assemblies are treated as tools that may be sold and supplied separately from molding systems.

U.S. Pat. No. 6,540,496 (Inventor: SCHAD, et al.; Filed: 30 Jun. 1999) discloses an injection molding machine having shooting pots for charging an injectable material into the mold cavity, each said shooting pot having an injection plunger for expressing said material from said shooting pot into said mold cavity, a shooting pot actuator including a pusher for each shooting pot, a linear position sensor operably attached to a control system, for sensing each said shooting pot actuator; and a drive means responsive to said control system and operable to separately move the pushers between said retracted and second positions. Specifically, FIG. 3 depicts the following: the position and linear velocity of plates 222 and 224 can be sensed by linear position sensor means 240. Sensor 240 can be a magnetic, opto-electronic or other suitable sensor, such as those manufactured by Temposonic Inc. Sensor 240 is fixed to frame 198, or otherwise fixed relative to plates 222 and 224. The sensor 240 can be attached to a suitable control system (not shown) for conventional electronic and/or programmable control of the actuator 200, as is well known to those of skill in the art. The position and speed of plate 224 during the forward stroke is sensed by sensor 240. Sensor 240 relays the information to the control system which in turn, controls the speed and distance traveled by the pushers 228. The position and speed of plate 222 are sensed by sensor 240 to control the speed and distance travelled by the pushers 226, as described above.

U.S. Pat. No. 6,491,509 (Inventor: SCHAD, et al.; Filed: 10 Dec. 2002) discloses an injection molding machine that has common control of multiple shooting pots in an injection molding machine, and that individual control of the shooting pot strokes is provided in these prior art injection molding machines. Separate hydraulic actuation cylinders for each shooting pot injection plunger are mounted inside the machine's stationary platen. These hydraulic cylinders must be individually set for stroke to control the individual metering of the resins into the mold cavities.

United States Patent Publication Number 20090274790 (JENKO, et al.; Filed: 17 Jul. 2009) discloses a hot runner system including a shoot pot system for transferring melt from a single shooting pot to multiple nozzles. Melt is fed from a source of melt into the cavity through the multiple nozzles, and a valve isolates melt in the cavity from melt in the source. A plunger within the cavity is driven forward to inject melt in the cavity into a mold cavity at high pressure without significantly increasing the pressure of melt in the source. The plunger optionally functions as both the plunger and the valve by opening and closing communication between the cavity and the manifold as it is rotated. Specifically, synchronized filling and consistent part weight can be adjusted and controlled through plunger 34 start and stop positions. These start and stop positions can be confirmed with sensors for greater precision and reliability.

SUMMARY

It is understood that the scope of the present invention is limited to the scope provided by the independent claims, and it is also understood that the scope of the present invention is not limited to: (i) the dependent claims, (ii) the detailed description of the non-limiting embodiments, (iii) the summary, (iv) the abstract, and/or (v) description provided outside of this document (that is, outside of the instant application as filed, as prosecuted, and/or as granted). It is understood that "comprising" means "including but not limited to the following".

According to one aspect, there is provided a mold-tool system (105) for use with a molding-system platen structure (107), the mold-tool system (105) comprising: a frame assembly (103) being connectable with the molding-system platen structure (107); and a set of shooting-pot assemblies (204) being supported by the frame assembly (103), wherein control of each shooting-pot assembly of the set of shooting-pot assemblies (204) is independent.

According to another aspect, there is provided a mold-runner system (200), comprising: a hot-runner frame assembly (202); a set of shooting-pot assemblies (204) being supported by the hot-runner frame assembly (202); and a melt-distribution assembly (250) being connected to the set of shooting-pot assemblies (204), the melt-distribution assembly (250) configured to distribute a melt to the set of shooting-pot assemblies (204); wherein control of each shooting-pot assembly of the group of shooting-pot actuators (207) is independent.

According to yet another aspect, there is provided a mold-runner system (200), comprising: a hot-runner frame assembly (202); a set of shooting-pot assemblies (204) being supported by the hot-runner frame assembly (202); a melt-distribution assembly (250) being connected to the set of shooting-pot assemblies (204), the melt-distribution assembly (250) configured to distribute a melt to the set of shooting-pot assemblies (204); a sensor assembly (206) being connected with shooting-pot assemblies of the set of shooting-pot assemblies (204), the sensor assembly (206) being configured to provide sensed signals indicating: (i) a position parameter, and (ii) a speed parameter associated with the shooting-pot assemblies; a group of shooting-pot actuators (207) being connected with a respective shooting-pot assembly of the set of shooting-pot assemblies (204); and a computer system (208), including: a processor (210); a sensor-interface module (212) connecting the processor (210) with the sensor assembly (206); a control-interface module (214) connecting the processor (210) with the group of shooting-pot actuators (207); and a controller-usable medium 216 connected with the processor (210), the controller-usable medium 216 embodying a collection of instructions 218 being executable by the processor (210), the collection of instructions 218 being configured to direct the processor (210) to: monitor, via the sensor-interface module (212), the sensed signals associated with the sensor assembly (206); and control, via the control-interface module (214), the group of shooting-pot actuators (207) in response to monitoring of the sensed signals associated with the shooting-pot assemblies, wherein the control of each shooting-pot assembly of the set of shooting-pot assemblies (204) is independent.

Other aspects and features of the non-limiting embodiments will now become apparent to those skilled in the art upon review of the following detailed description of the non-limiting embodiments with the accompanying drawings.

DETAILED DESCRIPTION OF THE DRAWINGS

The non-limiting embodiments will be more fully appreciated by reference to the following detailed description of the non-limiting embodiments when taken in conjunction with the accompanying drawings, in which:

FIG. 6A, 6B depict yet again another schematic representation of the mold-runner system (200) of FIG. 1.

The drawings are not necessarily to scale and may be illustrated by phantom lines, diagrammatic representations and fragmentary views. In certain instances, details not necessary for an understanding of the embodiments (and/or details that render other details difficult to perceive) may have been omitted.

DETAILED DESCRIPTION OF THE NON-LIMITING EMBODIMENT(S)

Figure 1:
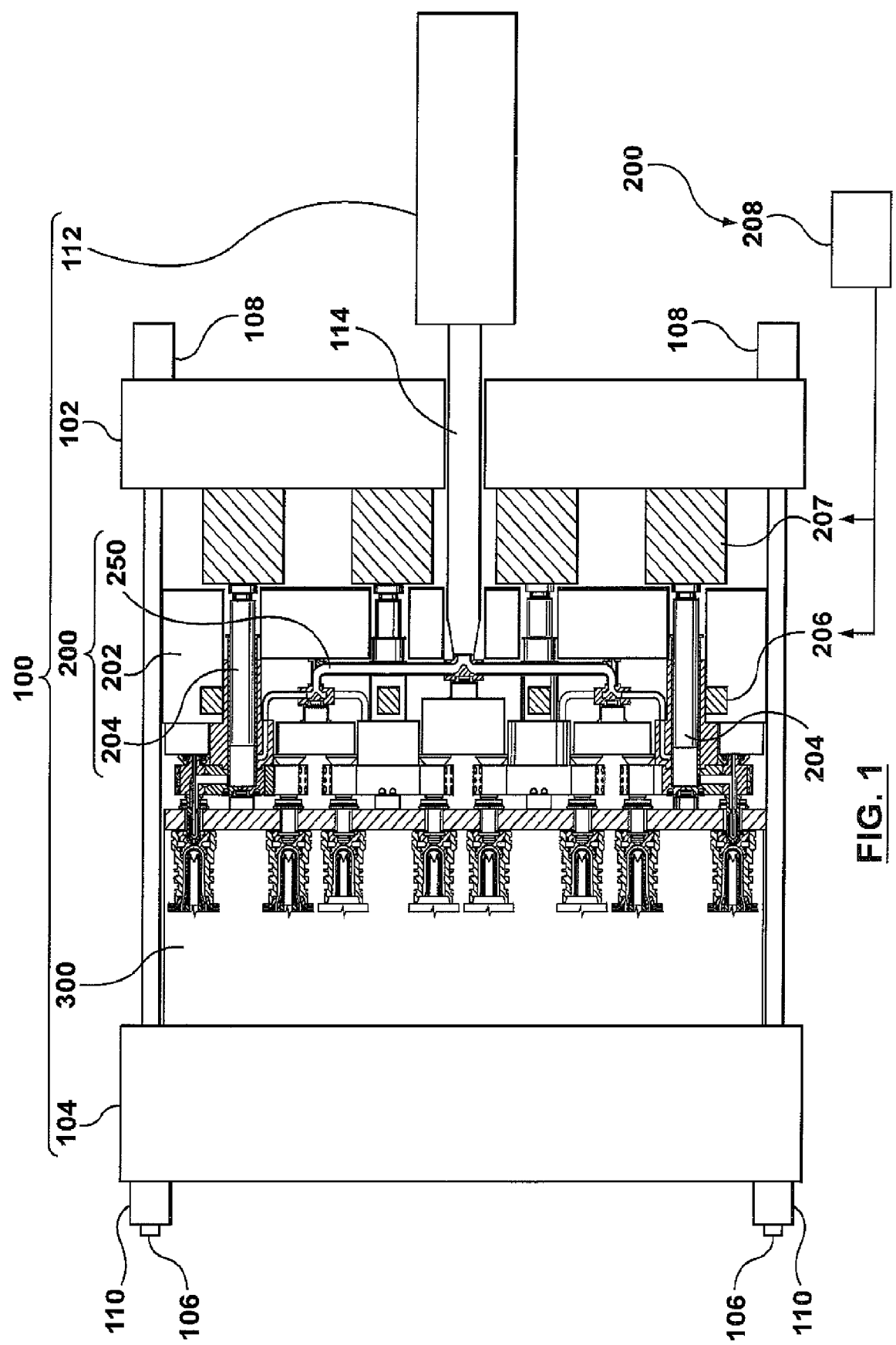
FIG. 1 depicts a schematic representation of a molding system (100) having a mold-runner system (200)

FIG. 1 depicts a schematic representation of a molding system (100) having a mold-runner system (200). FIG. 1 depicts, at least in part, a cross-sectional view of the mold-runner system (200). The molding system (100) and the mold-runner system (200) may include components that are known to persons skilled in the art, and these known components will not be described here; these known components are described, at least in part, in the following reference books (for example): (i) "*Injection Molding Handbook*" authored by OSSWALD/TURNG/GRAMANN (ISBN: 3-446-21669-2), (ii) "*Injection Molding Handbook*" authored by ROSATO AND ROSATO (ISBN: 0-412-99381-3), (iii) "*Injection Molding Systems*" 3$^{rd}$ Edition authored by JOHANNABER (ISBN 3-446-17733-7) and/or (iv) "*Runner and Gating Design Handbook*" authored by BEAUMONT (ISBN 1-446-22672-9). It will be appreciated that for the purposes of this document, the phrase "includes (but is not limited to)" is equivalent to the word "comprising". The word "comprising" is a transitional phrase or word that links the preamble of a patent claim to the specific elements set forth in the claim which define what the invention itself actually is. The is transitional phrase acts as a limitation on the claim, indicating whether a similar device, method, or composition infringes the patent if the accused device (etc) contains more or fewer elements than the claim in the patent. The word "comprising" is to be treated as an open transition, which is the broadest form of transition, as it does not limit the preamble to whatever elements are identified in the claim.

The molding system (100) includes (but is not limited to): a stationary platen (102), and a movable platen (104) that is movable relative to the stationary platen (102). The molding system (100) also includes a set of tie bars (106) extending between the stationary platen (102) and the movable platen (104). Clamp units (108) are connected with an end of a respective tie bar (106), and the clamp units (108) are supported by the stationary platen (102). Lock units (110) are coupled to opposite ends of the tie bars (106). The lock units (110) selectively lock the tie bars (106) so as to prevent relative movement between the stationary platen (102) and the movable platen (104). A melt-liquefier assembly (112) is used to prepare hot melt from solidified pellets, etc. A machine nozzle (114) connects the melt-liquefier assembly (112) with the mold-runner system (200). The molding system (100) is configured to support a mold-runner system (200) and a mold assembly (300). It will be appreciated that the molding system (100), the mold-runner system (200) and the mold assembly (300) may be provided by one vendor or by a plurality of vendors. The mold-runner system (200) is connected with and supported by the stationary platen (102). The mold assembly (300) has a movable mold portion that is connected with and supported by the movable platen (104). The mold assembly (300) has a stationary mold portion that is connected with and supported by the mold-runner system (200). The movable mold portion is movable relative to the stationary mold portion.

There is also provided, as a general arrangement, a mold-tool system (105) for use with a molding-system platen structure (107). The mold-tool system (105) includes (but is not limited to): (i) a frame assembly (103) connectable with the molding-system platen structure (107), and (ii) a set of shooting-pot assemblies (204) supported by the frame assembly (103). Control of each shooting-pot assembly of the set of shooting-pot assemblies (204) is independent; that is, each shooting-pot assembly of the set of shooting-pot assemblies (204) are controlled independently of all other shooting-pot assembly of the set of shooting-pot assemblies (204). The mold-tool system (105) may include: (i) the mold-runner system (200), and/or (ii) the mold assembly (300). The mold assembly (300) may be connectable with the set of shooting-pot assemblies (204). It will be appreciated that the mold-runner system (200) and the mold assembly (300) may be treated as replaceable tools in the molding system (100), much like a printer-cartridge assembly is replaceable in a printer system. According to a variant or a non-limiting example, the mold-tool system (105) is arranged so that: (i) the frame assembly (103) includes a hot-runner frame assembly (202) of a mold-runner system (200), and (ii) the set of shooting-pot assemblies (204) are supported by the hot-runner frame assembly (202).

The mold-runner system (200) includes (but is not limited to): a hot-runner frame assembly (202), and a set of shooting-pot assemblies (204) supported by the hot-runner frame assembly (202), and a melt-distribution assembly (250) connected to the set of shooting-pot assemblies (204), the melt-distribution assembly (250) configured to distribute a melt (at least one or more melted resins, etc) to the set of shooting-pot assemblies (204). The hot-runner frame assembly (202) may include, by way of example, a plate assembly, etc. The hot-runner frame assembly (202) may be configured to support the melt-distribution assembly (250) as well. The mold-runner system (200) also includes a sensor assembly (206) being connected with each shooting-pot assembly of the set of shooting-pot assemblies (204). The sensor assembly (206) is configured to provide sensed signals indicating: (i) a position parameter (also known as travel or stroke) that may be sensed by a position sensor (the position sensor is known in the art and therefore will not be further described), and (ii) a speed parameter (that may be sensed by a speed sensor for determining feed rate), and both types of sensors are used with each of the shooting-pot assemblies (204). The mold-runner system (200) also includes (but is not limited to) a group of shooting-pot actuators (207) connected with a respective shooting-pot assembly of the set of shooting-pot assemblies (204). The mold-runner system (200) also includes (but is not limited to) a computer system (208), which is depicted with more detail in association with FIG. 2.

The mold-runner system (200) may be implemented as (that is, may include) a hot-runner system, or as a cold-runner system. The mold-runner system (200) may be supported between the platens of the molding system (100). A hot-runner system is an assembly of heated components used in plastic injection molds that inject molten plastic into the cavities of the mold. The cavities are the part of the mold shaped like the parts to be produced. By contrast, a cold-runner system is a channel formed between the two halves of the mold, for the purpose of carrying plastic (melt) from the injection molding machine nozzle to the mold cavities. Each time the mold opens to eject the newly formed plastic parts, the material in the runner is ejected as well, resulting in waste. A hot runner system usually includes a heated manifold and a number of heated nozzles. The main task of the manifold is to distribute the plastic entering the mold to the various nozzles which then meter it precisely to the injection points in the cavities. Hot runners are fairly complicated systems, they have to maintain the plastic material within them heated uniformly, while the rest of the injection mold is being cooled in order to solidify the product quickly. Two main types of hot runner systems are the externally heated and internally heated. In the externally heated type, molten plastic runs within a solid manifold and within the nozzles. In the internally heated, the plastic flows directly over slender heaters inside oversized runners. The outside boundaries of the runners normally solidify, so the plastic material flows only in proximity of the internal heaters or "torpedoes". A hot runner controller is a temperature controller used to control the temperature in the hot runner. This helps create the most consistent part(s). Hot runners usually make the mold more expensive to manufacture and run, but allow savings by reducing plastic waste and by reducing the cycle time (do not have to wait until the runners freeze). When trying to injection molding materials such as liquid silicone or rubber into a mold, the stock material(s) are often fluid and not solid, as with plastics. This is often referred to as Liquid Injection Molding (LIM). In contrast to hot runners, which keep the material at high molten temperatures between injections, there is also an alternate type of cold runner system, which, in this case of LIM molding the runner is not ejected at every cycle. This type of cold runner is engineered to ensure that the liquid does not encounter detrimental shear heat build-up during injection.

In this type of cold-runner system for molding fluid stock, the materials may be supplied in barrels or hobbocks. Because of their low viscosity, these rubbers can be pumped through pipelines and tubes to the vulcanization equipment or mold cavity. The two components are pumped through a static mixer by a metering pump. One of the components contains the catalyst, typically platinum based. A coloring paste as well as other additives can also be added before the material enters the static mixer section. In the static mixer the components are well mixed and are transferred to the cooled metering section of the injection molding machine. The static mixer renders a very homogeneous material that results in products that are not only very consistent throughout the part, but also from part to part. This is in contrast to solid silicone rubber materials that are purchased pre-mixed and partially vulcanized. In contrast, hard silicone rubbers are processed by transfer molding and result in less material consistency and control, leading to higher part variability. Additionally, solid silicone rubber materials are processed at higher temperatures and require longer vulcanization times. From the metering section of the injection molding machine, the compound is pushed through cooled sprue and runner systems into a heated cavity where the vulcanization takes place. The cold runner and general cooling mechanisms result in no loss of molding material in the feed lines. The cooling allows production of LSR parts with nearly zero material waste, eliminating trimming operations and yielding significant savings in material cost.

As a basic minimum configuration, the set of shooting-pot assemblies (204) is arranged so that control of each shooting-pot assembly of the set of shooting-pot assemblies (204) is independent. That is, each shooting-pot assembly is controlled independently of other shooting-pot assemblies of the set of shooting-pot assemblies (204). Specifically, the mold-runner system (200) includes (but is not limited to): the hot-runner frame assembly (202), the set of shooting-pot assemblies (204) being supported by the hot-runner frame assembly (202), and the melt-distribution assembly (250) being connected to the set of shooting-pot assemblies (204), the melt-distribution assembly (250) configured to distribute a melt to the set of shooting-pot assemblies (204), and control of each shooting-pot assembly of the group of shooting-pot actuators (207) is independent.

Figure 2:
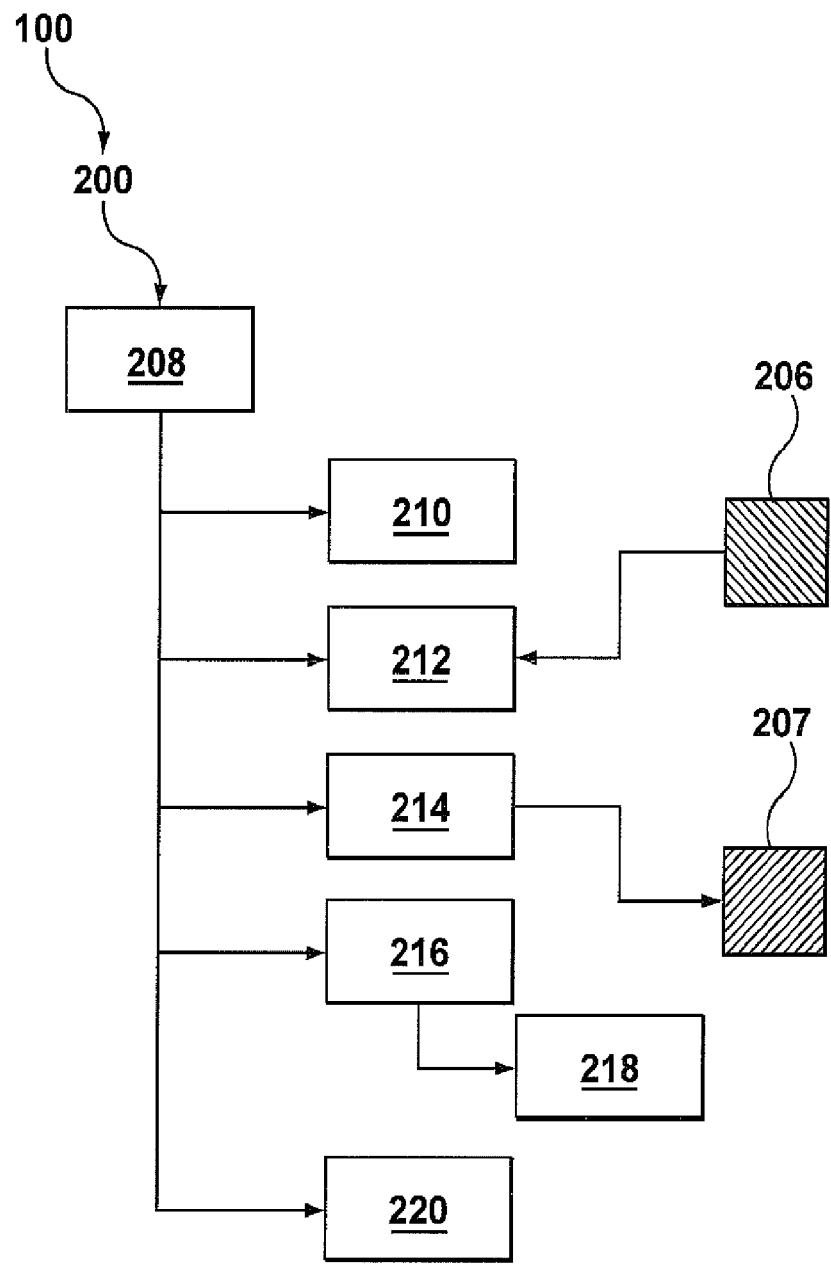
FIG. 2 depicts a schematic representation of a computer system (208) used with the shooting-pot assembly (204) of the mold-runner system (200) of FIG. 1.

FIG. 2 depicts a schematic representation of the computer system (208) of the mold-runner system (200) of FIG. 1. The computer system (208) includes (but is not limited to): (i) a processor (210), (ii) a sensor-interface module (212), a control-interface module (214), a controller-usable medium (216). The processor (210) is also called a central processing unit (CPU), which is part of a computer system (such as, for example but not limited to, a microprocessor chip) that does most of the data processing tasks and/or instructions and/or computations; the processor (210) forms the central part of the computer system (208) to which the peripherals are attached. The sensor-interface module (212) is also known as interface module, a computer interface, etc, such as a serial port, a Universal Serial Bus (USB) port, etc. The sensor-interface module (212) generally refers to a connection or interface apparatus for connecting the processor (210) to other electronic devices, such as (but not limited to) a network. The sensor-interface module (212) may include an interface between hardware components which are physical interfaces and also may include software interfaces, which exist between separate software components and provide a programmatic mechanism by which the hardware interface can communicate. The controller-usable medium (216) is also known as a computer memory, a storage unit, a computer storage unit, a store, a memory board, which is an electronic-memory device or any device which may be connected to the processor (210) that may be used to embody the collection of instructions (218), such as, but not limited to a CD (Compact Disc, a processor-usable medium, etc), random-access memory (RAM), etc. The collection of instructions (218) is instructions that are executable by the processor (210), such as a line of code written as part of a computer program. To manufacture the collections of instructions (218), a high-level programming language was or is used. A high-level programming language is a programming language with strong abstraction from the details of a particular computer system. In comparison to low-level programming languages, such as the collection of instructions (218), it may use natural language elements, be easier to use, or be more portable across platforms (that is, computer systems). Such languages hide the details of CPU operations such as memory access models and management of scope. This greater abstraction and hiding of details is generally intended to make the language user-friendly, as it includes concepts from the problem domain instead of those of the machine. A high-level language isolates the execution semantics of computer architecture from the specification of the program, making the process of developing a program simpler and more understandable with respect to a low-level language. The amount of abstraction provided defines how "high-level" a programming language is. A compiler is software that converts a set of high-level language statements or instructions into a lower-level representation (such as the collection of instructions (218) and/or is software that translates a program written in a high-level programming language (C/C++, COBOL, etc.) into machine language. A compiler usually generates assembly language first and then translates the assembly language into machine language. A utility known as a "linker" then combines all required machine language modules into an executable program that can run in the computer. The user interface (220) is an interface between a human and the computer system.

The sensor-interface module (212) connects the processor (210) with the sensor assembly (206). The control-interface module (214) connects the processor (210) with the group of shooting-pot actuators (207). The controller-usable medium (216) is connected to the processor (210), the controller-usable medium (216) embodying a collection of instructions (218) being executable by the processor (210), the collection of instructions (218) being configured to direct the processor (210) to: (i) monitor, via the sensor-interface module (212), the sensed signals associated with the sensor assembly (206); and control, via the control-interface module (214), the group of shooting-pot actuators (207) in response to monitoring of the sensed signals associated with the shooting-pot assemblies.

With the above arrangement, it will be appreciated that at least one shooting-pot assembly of the set of shooting-pot assemblies (204) has a different volume of melt in comparison to a volume of melt in at least one other shooting-pot assembly of the set of shooting-pot assemblies (204); that is, the volumes of the shooting-pot assemblies may be all different from each other, or may be different in part to other shooting-pot assemblies.

Generally speaking, the computer system (208) is configured to monitor and to control each shooting-pot assembly in the mold-runner system (200), so that each shooting-pot operates independently of one another. The parameters are independently monitored and shooting-pot assemblies are independently controlled, such as the stroke (also called travel) of each shooting-pot assembly and speed (feed rate) of each shooting-pot assembly. The stroke or travel is related to shot volume. The monitoring and controlling devices (which are also called sensors) used in the injection molding nozzle may be used for the monitoring and controlling of the shooting-pot assemblies. There are a number of advantages for independently monitoring and controlling each shooting-pot assembly. For example, this arrangement may produce different sized parts in a single hot runner system. In another example, this arrangement may process different resins under separate processing profiles in a mold-runner system. For example, some resins, such as PET (polyethylene terephthalate), should not be processed with fast feed or speed rates comparatively speaking with regard to other resins because PET quickly deteriorates, relative to other types of resin, under higher feeds/speeds. Another advantage with this arrangement is that the stroke and/or speed of a single shooting pot can be varied during a single cycle of the molding system (100). This allows for efficient operation and a quality part. For example and for optimum part quality, some resins do well being processed with an initial speed or feed rate and then sometime thereafter a faster speed for optimum filling and packing of the part (part quality and efficiency). In summary, the computer system (208) separately varies an injection profile for each shooting-pot assembly of the mold-runner system (200). Shooting-pot actuators may be controlled during the forward or backward motion based on sensed pressure, speed, or relationship to other shooting pots or signals to provide a desirable injection or refill profile. Independent stoke variation for each nozzle on a multiple nozzle assembly in a single hot runner. The stroke of the shooting pot plunger can be made sufficiently adjustable to accommodate a significantly different shot mass, thereby allowing use of the shooting pot with various sets of cores/cavities or a different mold altogether. Also, different resins that are injected into the same cavity may require different shot volumes due to variable resin specific gravity; stroke adjustment compensates for these differences.

Figure 3:
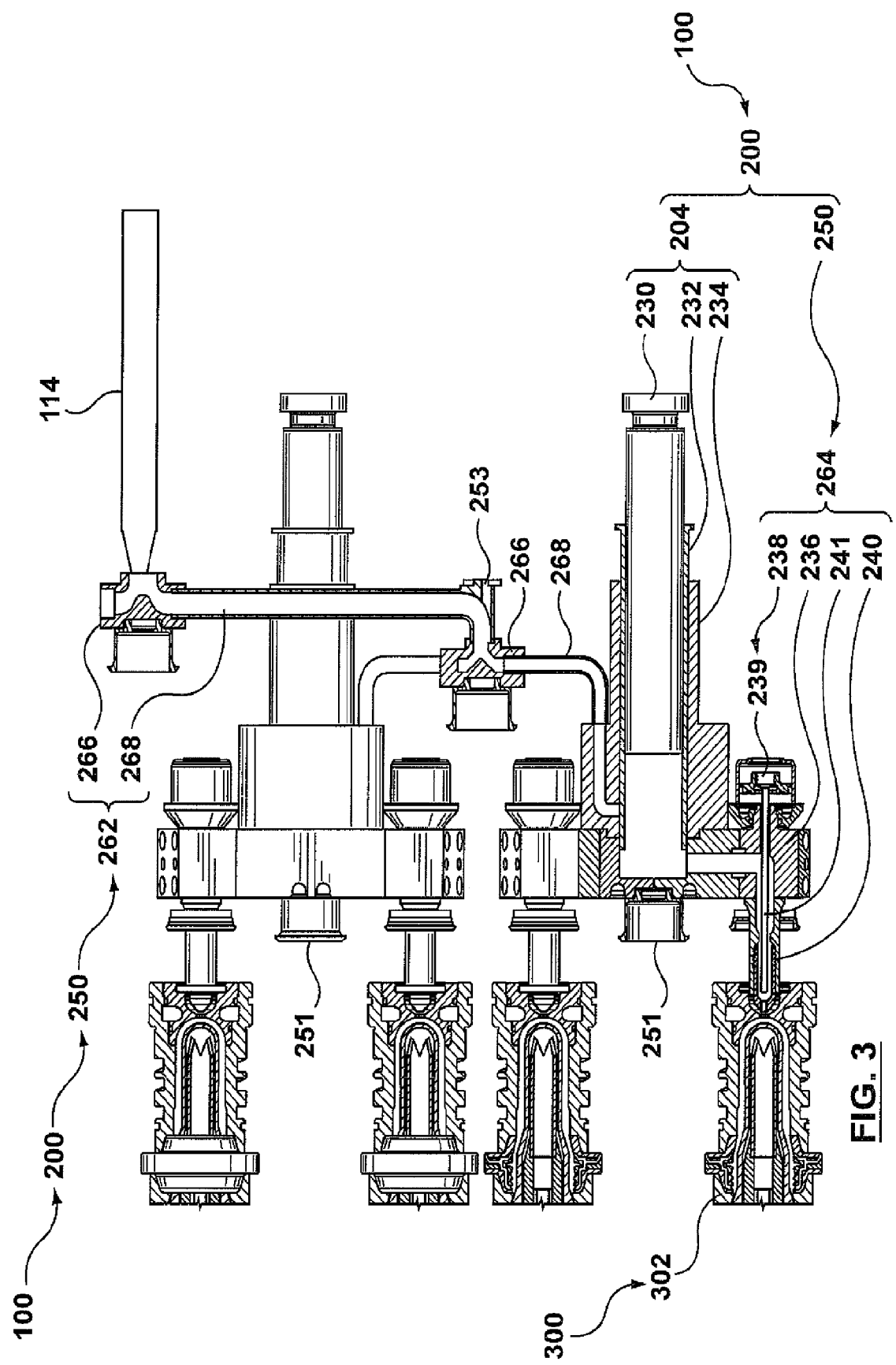
FIG. 3 depicts another schematic representation of the shooting-pot assembly of the mold-runner system (200) of FIG. 1.

FIG. 3 depicts another schematic representation of the shooting-pot assembly of the mold-runner system (200) of FIG. 1. FIG. 3 depicts, at least in part, a cross-sectional view of the mold-runner system (200). By way of example, the melt-distribution assembly (250) includes (but is not limited to): a relatively lower-pressure circuit (262) (hereafter referred to, from time to time, as the "lower-pressure circuit (262)"), and a relatively higher-pressure circuit (264) (hereafter referred to, from time to time, as the "higher-pressure circuit (264)"). Generally, the relatively lower-pressure circuit (262) is configured to connect the machine nozzle (114) of the melt-liquefier assembly (112) with the set of shooting-pot assemblies (204). The higher-pressure circuit (264) is configured to connect the set of shooting-pot assemblies (204) with the mold assembly (300). By way of example (but not limited to the following description), the higher-pressure circuit (264) may be configured to connect the set of shooting-pot assemblies (204) with the mold assembly (300) in the following arrangements: (i) each nozzle (240) of the each shooting-pot assembly may be connected with a respective mold cavity of the mold assembly (300), and/or (ii) several nozzles of the each shooting-pot assembly may be connected with one or more respective mold cavity of the mold assembly (300).

By way of example, the relatively lower-pressure circuit (262) includes (but is not limited to): (i) a grouping of melt-splitter assemblies (266), and (ii) a collection of conduits (268). The grouping of melt-splitter assemblies (266) and the collection of conduits (268) are configured to connect the machine nozzle (114) of the melt-liquefier assembly (112) with the set of shooting-pot assemblies (204) in accordance with a hierarchy of interconnected levels, as may be required depending on the number of shooting-pot assemblies being used.

It will be appreciated that the conduits of the collection of conduits (268) may be formed or defined by: (i) flexible conduits (also called flexible tubes or flexible hoses, etc), (ii) rigid conduits (also called rigid tubes, etc), (iii) a collection of flexible conduits and rigid conduits, and/or (iv) a manifold plate (a manifold block, etc).

By way of example, the shooting-pot assembly (204) includes (but is not limited to): a plunger (230), a shooting-pot housing (234), and a sleeve-refill valve (232). The shooting-pot housing (234) defines an internal chamber configured to receive the hot melt. The shooting-pot housing (234) is configured to interface (via ports) with the lower-pressure circuit (262) and the higher-pressure circuit (264). The sleeve-refill valve (232) is configured to slide along the shooting-pot housing (234) so as to open and close the ports. Either one port is closed while the other port is opened or visa versa, so that isolation is maintained between the lower-pressure circuit (262) and the higher-pressure circuit (264). In operation, the shooting-pot assembly (204), which may be called a shooting-pot module, depicted as receiving the hot melt from the melt-distribution assembly (250). The sleeve-refill valve (232) slides along the shooting-pot housing (234), and maintains isolation between the lower-pressure circuit (262) and the higher-pressure circuit (264), between two operative conditions, which are: (i) recharging condition and an injection condition. In the recharging condition, the sleeve-refill valve (232) is actuated to (configured to) retract so as to: (i) permit the hot melt to be received from the conduit (268) of the lower-pressure circuit (262) of the melt-distribution assembly (250), and block the melt from being received in the higher-pressure circuit (264). The plunger (230) is retracted (either actively or passively) and the hot melt is received in the shooting-pot chamber. The injection condition is depicted in FIG. 4.

Figure 4:
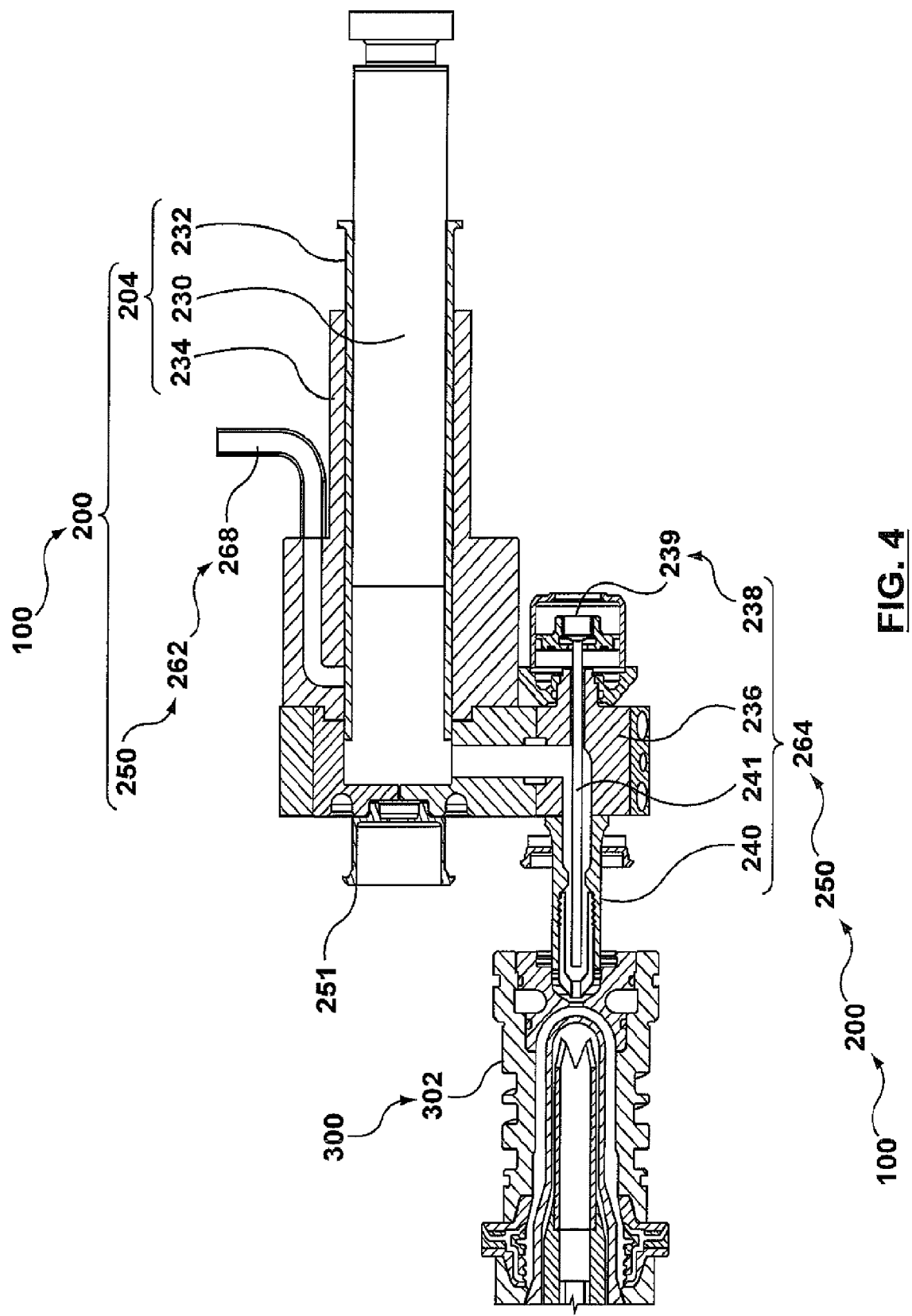
FIG. 4 depicts yet another schematic representation of the shooting-pot assembly of the mold-runner system (200) of FIG. 1.

FIG. 4 depicts yet another schematic representation of the shooting-pot assembly of the mold-runner system (200) of FIG. 1. FIG. 4 depicts, at least in part, a cross-sectional view of the mold-runner system (200). In the injection condition, the lower-pressure circuit (262) is isolated form the shooting-pot assembly (204) while the internal chamber of the shooting-pot assembly is fluidly connected with the higher-pressure circuit (264), and then the plunger (230) is translated so as to inject the hot melt into the mold cavity of the mold assembly (300).

Figure 5:
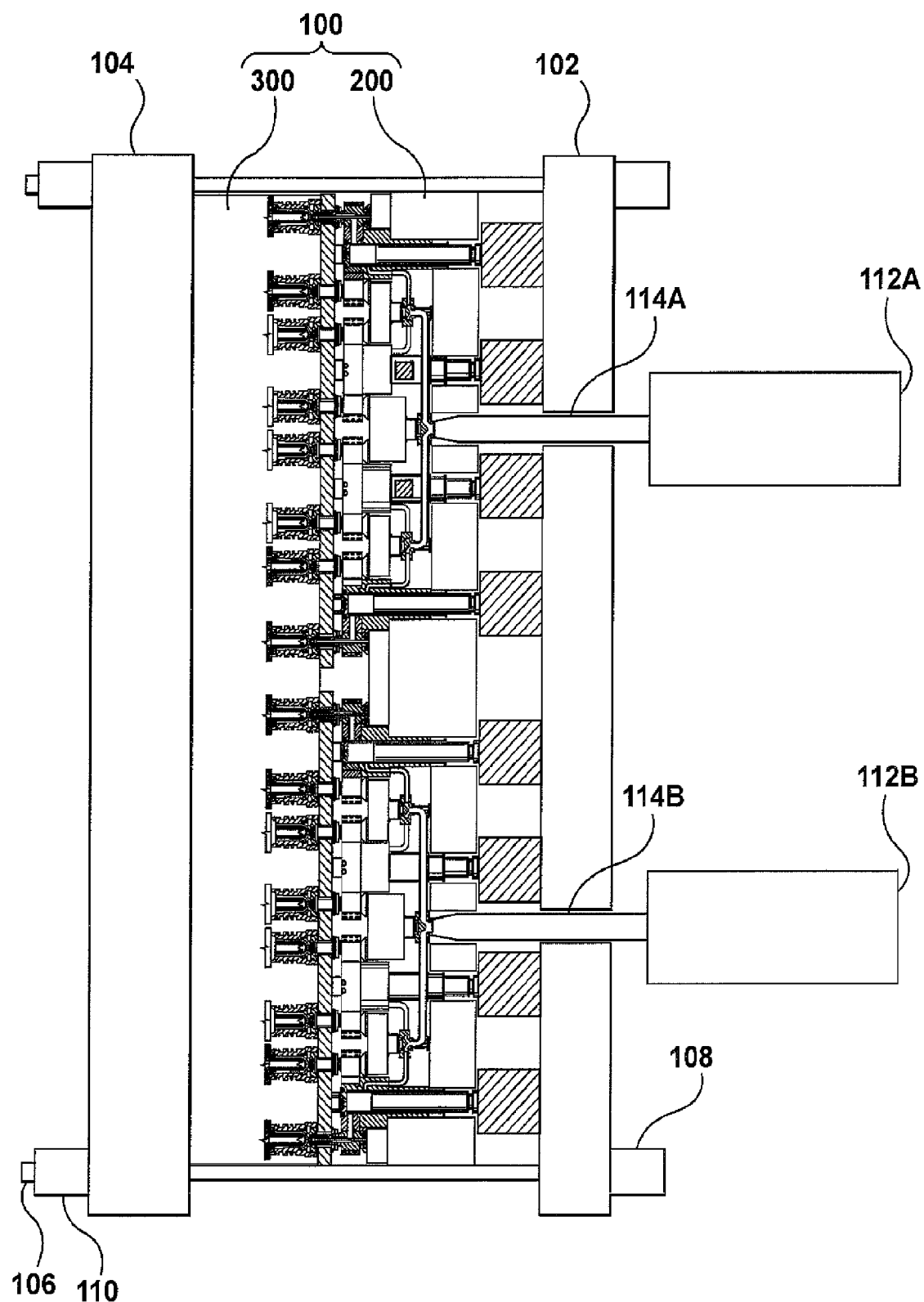
FIG. 5 depicts another schematic representation of the molding system (100) of FIG. 1.

FIG. 5 depicts another schematic representation of the molding system (100) of FIG. 1. FIG. 5 depicts, at least in part, a cross-sectional view of the mold-runner system (200), in which the mold-runner system (200) is modified, by way of example, so that the melt-distribution assembly (250) is configured to: (i) connect with a first-machine nozzle (114A) of a first-melt liquefier (112A) that is configured to provide a first resin to the melt-distribution assembly (250), and (ii) connect with a second-machine nozzle (114B) of a second-melt liquefier (112B) that is configured to supply a second resin to the melt-distribution assembly (250). The first-melt liquefier (112A) is configured to provide a first resin, via the second-machine nozzle (114B), to the mold-runner system (200). The second-melt liquefier (112B) is configured to supply, via the second-machine nozzle (114B), a second resin to the mold-runner system (200). For example, the first resin may include TPE (Thermoplastic Elastomer), and the second resin may include PE (polyethylene). The mold-runner system (200) works with a plurality of melt liquefiers (such as, extruders) where each melt liquefier is simultaneously supplying a different type of resin to the mold-runner system (200). It may not be advantageous to process all types of resins under the same conditions or in the same way (temperatures, feeds, etc.). The mold-runner system (200) allows for simultaneously processing of different resins in the mold-runner system (200) under different processing parameters. For example, the processing profiles for TPE resin and PE resin are significantly different. The mold-runner system (200) provides for different processing profiles for a plurality of resins. The mold-runner system (200) also allows for simultaneously processing different resins under different processing parameters to make different parts thus providing the advantage of customizing the processing profile for each resin type. For example, the first type of resin made in the first-melt liquefier (112A) is a resin having a first color such as TPE Blue, and the second type of resin made in the second-melt liquefier (112B) is a resin having a second color (either an entirely different resin or the same as the first type of resin), such as TPE Yellow.

FIG. 6A depicts yet again another schematic representation of the mold-runner system (200) of FIG. 1. FIG. 6A depicts, at least in part, a cross-sectional view of the mold-runner system (200). FIG. 6B depicts the melt-splitter assemby (266) of the grouping of melt-splitter assemblies (266), which includes (but is not limited to): a disk-shaped body having or defining an input port (281), and a plurality of output ports (282) connected with the input port (281).

It is noted that the foregoing has outlined the non-limiting embodiments. Thus, although the description is made for particular non-limiting embodiments, the scope of the present invention is suitable and applicable to other arrangements and applications. Modifications to the non-limiting embodiments can be effected without departing from the scope of the independent claims. It is understood that the non-limiting embodiments are merely illustrative.

What is claimed is:

1. A mold-tool system for use with a molding-system platen structure, the mold-tool system comprising:
a frame assembly being connectable with the molding-system platen structure; and
a set of shooting-pot assemblies being supported by the frame assembly, wherein each shooting-pot assembly of the set of shooting-pot assemblies is controlled to actuate independently of other shooting-pot assemblies within the set of shooting-pot assemblies.

2. The mold-tool system of claim 1, wherein:
the frame assembly includes a hot-runner frame assembly of a mold-runner system, and
the set of shooting-pot assemblies are supported by the hot-runner frame assembly.

3. The mold-tool system of claim 2, further comprising:
a melt-distribution assembly being connected to the set of shooting-pot assemblies, the melt-distribution assembly configured to distribute a melt to the set of shooting-pot assemblies.

4. The mold-tool system of claim 3, wherein:
the melt-distribution assembly is configured to:
(i) connect with a first-machine nozzle of a first-melt liquefier being configured to provide a first resin to the melt-distribution assembly; and
(ii) connect with a second-machine nozzle of a second-melt liquefier being configured to supply a second resin to the melt-distribution assembly.

5. The mold-tool system of claim 3, wherein:
the melt-distribution assembly includes:
a relatively lower-pressure circuit, and
a relatively higher-pressure circuit,
the relatively lower-pressure circuit is configured to connect a machine nozzle of a melt-liquefier assembly with the set of shooting-pot assemblies,
the relatively higher-pressure circuit is configured to connect the set of shooting-pot assemblies with a mold assembly.

6. The mold-tool system of claim 5, wherein:
the relatively lower-pressure circuit includes:
a grouping of melt-splitter assemblies, and
a collection of conduits,
the grouping of melt-splitter assemblies and the collection of conduits are configured to connect the machine nozzle of the melt-liquefier assembly with the set of shooting-pot assemblies in accordance with a hierarchy of interconnected levels.

7. The mold-tool system of claim 6, wherein:
the collection of conduits includes flexible conduits.

8. The mold-tool system of claim 6, wherein:
the collection of conduits includes rigid conduits.

9. The mold-tool system of claim 3, wherein:
at least one shooting-pot assembly of the set of shooting-pot assemblies has a different volume of melt in comparison to a volume of melt in at least one other shooting-pot assembly of the set of shooting-pot assemblies.

10. The mold-tool system of claim 3, further comprising:
a sensor assembly being connected with shooting-pot assemblies of the set of shooting-pot assemblies, the sensor assembly being configured to provide sensed signals indicating: (i) a position parameter, and (ii) a speed parameter associated with the shooting-pot assemblies;
a group of shooting-pot actuators being connected with a respective shooting-pot assembly of the set of shooting-pot assemblies; and
a computer system, including:
a processor;
a sensor-interface module connecting the processor with the sensor assembly;
a control-interface module connecting the processor with the group of shooting-pot actuators; and
a controller-usable medium connected with the processor, the controller-usable medium embodying a collection of instructions being executable by the processor, the collection of instructions being configured to direct the processor to:
monitor, via the sensor-interface module, the sensed signals associated with the sensor assembly; and
control, via the control-interface module, the group of shooting-pot actuators in response to monitoring of the sensed signals associated with the shooting-pot assemblies, so that the control of the each shooting-pot assembly of the set of shooting-pot assemblies is independent.

11. The mold-tool system of claim 10, wherein:
the melt-distribution assembly is configured to:
(i) connect with a first-machine nozzle of a first-melt liquefier being configured to provide a first resin to the melt-distribution assembly; and
(ii) connect with a second-machine nozzle of a second-melt liquefier being configured to supply a second resin to the melt-distribution assembly.

12. The mold-tool system of claim 10, wherein:
the melt-distribution assembly includes:
a relatively lower-pressure circuit, and
a relatively higher-pressure circuit,
the relatively lower-pressure circuit is configured to connect a machine nozzle of a melt-liquefier assembly with the set of shooting-pot assemblies,
the relatively higher-pressure circuit is configured to connect the set of shooting-pot assemblies with a mold assembly.

13. The mold-tool system of claim 12, wherein:
the relatively lower-pressure circuit includes:
a grouping of melt-splitter assemblies, and
a collection of conduits,
the grouping of melt-splitter assemblies and the collection of conduits are configured to connect the machine nozzle of the melt-liquefier assembly with the set of shooting-pot assemblies in accordance with a hierarchy of interconnected levels.

14. The mold-tool system of claim 10, wherein:
at least one shooting-pot assembly of the set of shooting-pot assemblies has a different volume of melt in comparison to a volume of melt in at least one other shooting-pot assembly of the set of shooting-pot assemblies.

15. The mold-tool system of claim 1, further comprising:
a mold assembly being connectable with the set of shooting-pot assemblies.

* * * * *